United States Patent [19]

Henke

[11] 4,141,288
[45] Feb. 27, 1979

[54] MACHINE AND METHOD FOR STACKING HAY

[75] Inventor: Donald L. Henke, Creston, Nebr.

[73] Assignee: VEDA, Inc., Long Lake, Minn.

[21] Appl. No.: 794,846

[22] Filed: May 9, 1977

Related U.S. Application Data

[63] Continuation-in-part of Ser. No. 546,385, Feb. 3, 1975, Pat. No. 4,022,004.

[51] Int. Cl.² ............... A01D 87/12; B65G 3/10
[52] U.S. Cl. ............................ 100/35; 100/66; 56/346
[58] Field of Search .................. 100/65–69, 100/35, 50; 56/344–350, 1; 214/9, 17 C; 130/20; 198/508, 747

[56] References Cited

U.S. PATENT DOCUMENTS

| | | | |
|---|---|---|---|
| 3,538,696 | 11/1970 | Carson | 56/350 |
| 3,555,997 | 1/1971 | van der Lely | 100/66 |
| 3,720,052 | 3/1973 | Anderson et al. | 56/346 |
| 3,925,974 | 12/1975 | Bartlett | 56/346 |

FOREIGN PATENT DOCUMENTS

| | | |
|---|---|---|
| 892881 | 2/1972 | Canada. |
| 1215994 | 5/1966 | Fed. Rep. of Germany. |

Primary Examiner—Feldman, Peter
Attorney, Agent, or Firm—Burd, Braddock & Bartz

[57] ABSTRACT

A hay stacking machine having a platform for supporting a stack of hay. The platform has a trough extended from its center to the outer peripheral edge for accommodating hay. A hay feeding mechanism having reciprocating teeth operates to move hay from the outer edge of the platform generally toward the center thereof. One embodiment of the machine has a movable elevator member located in the center of the platform operable to move hay upwardly to build the center of the stack. An annular cage extends around the platform and rotates relative thereto. The cage has a plurality of upright posts carrying compression arms which extend toward the center of the platform. The pressure arms move with the cage and engage the hay located on the platform to sweep it along the platform top surface causing a stack of hay to form from the bottom up. The unloading of the hay stack from the platform is accomplished by opening gate sections of the cage and tipping the platform rearwardly and downwardly. A push-off member moves from the forward end to the rearward end of the platform to slide the hay stack off the platform.

43 Claims, 31 Drawing Figures

U.S. Patent  Feb. 27, 1979  Sheet 1 of 7  4,141,288
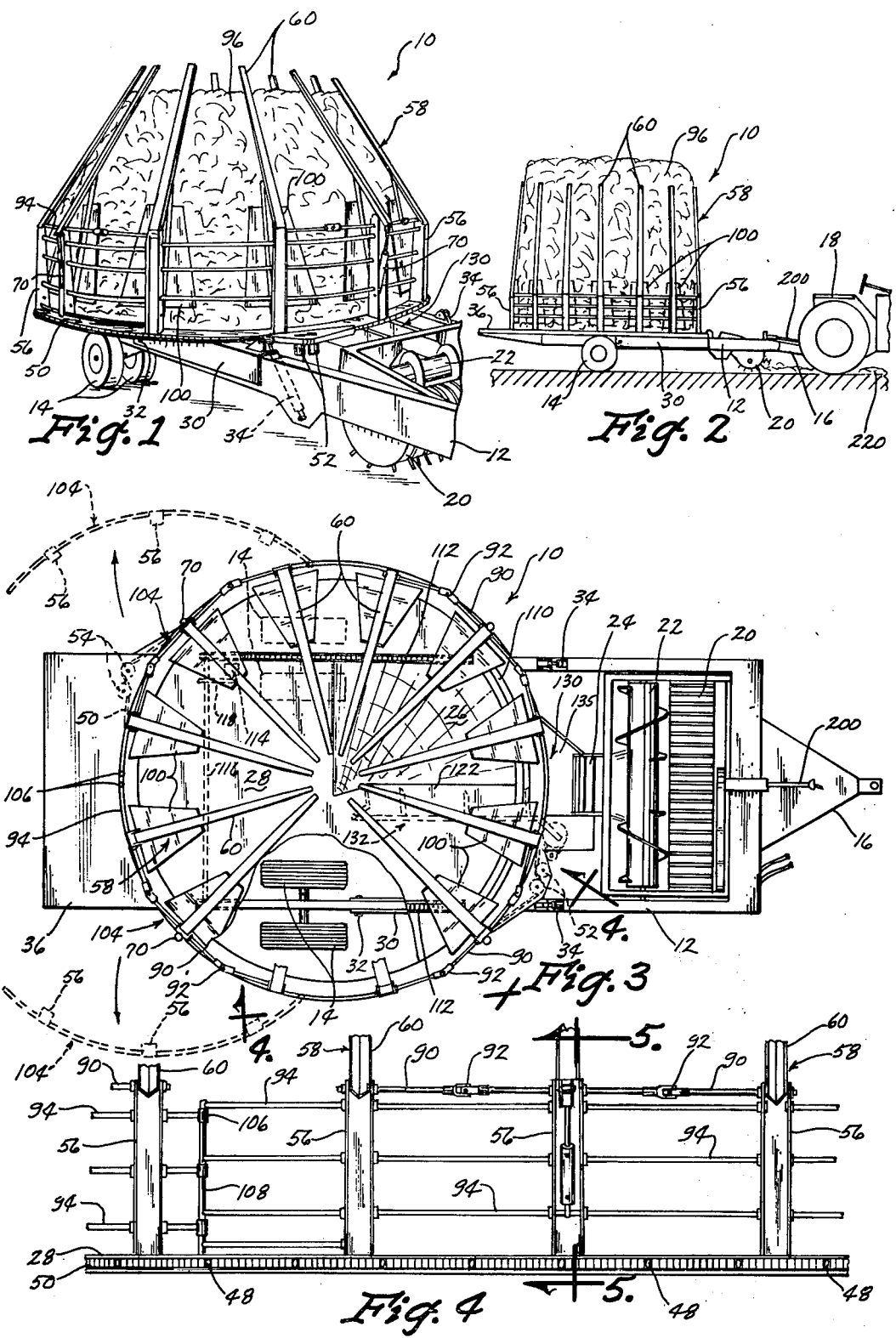

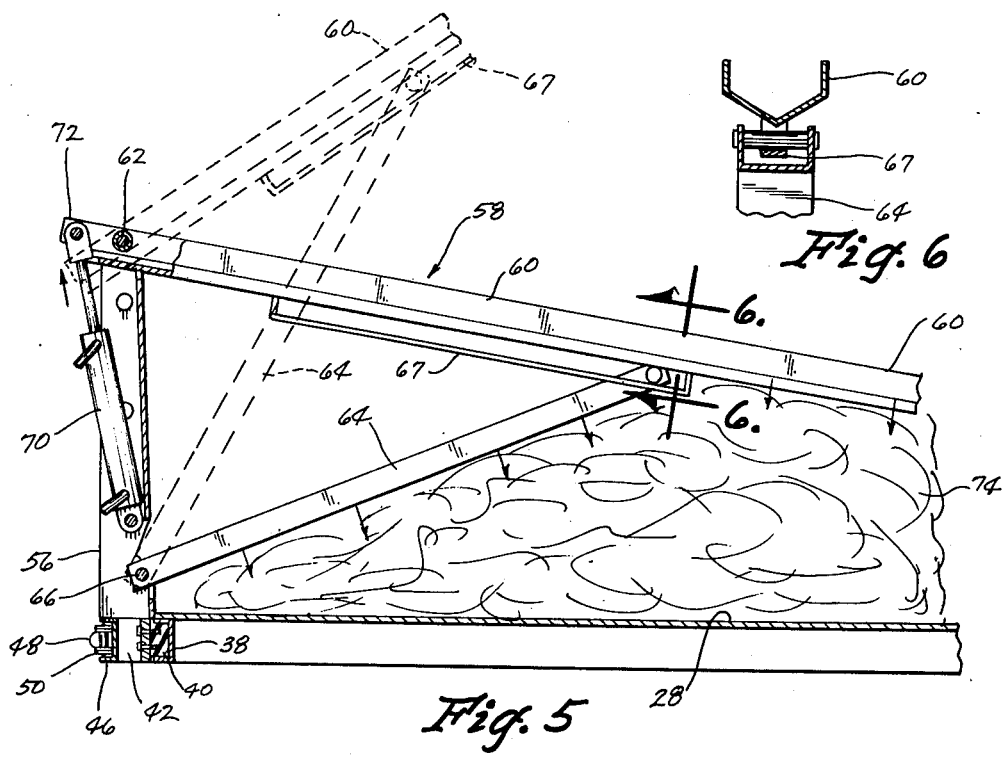
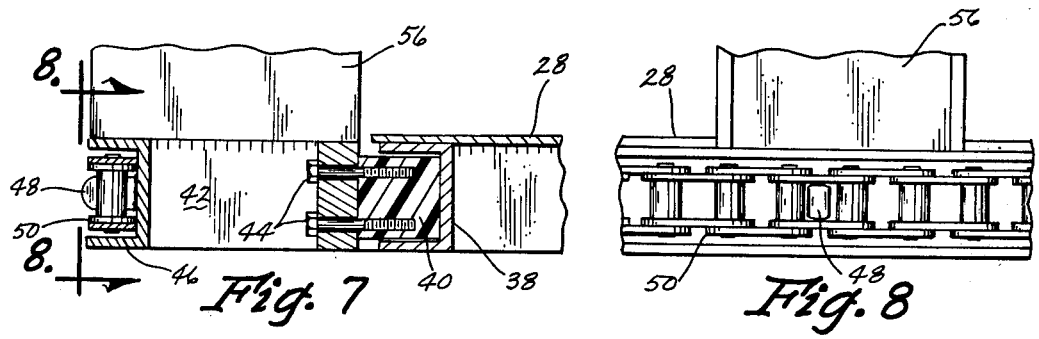
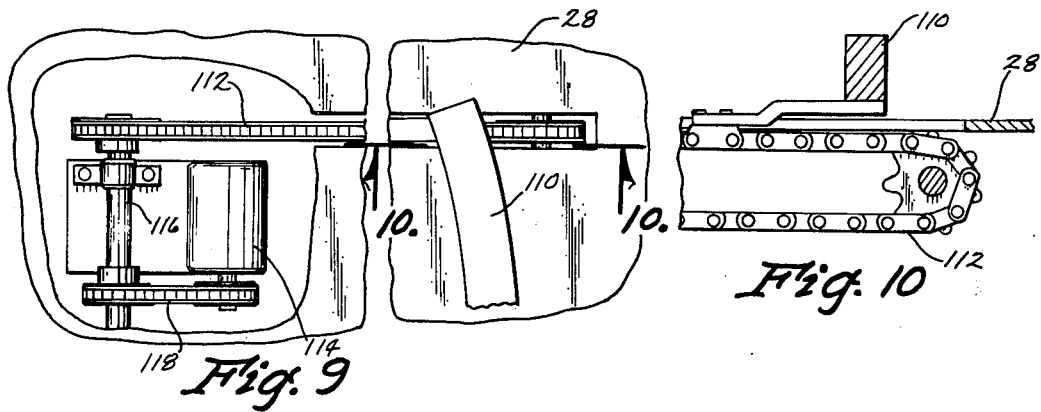

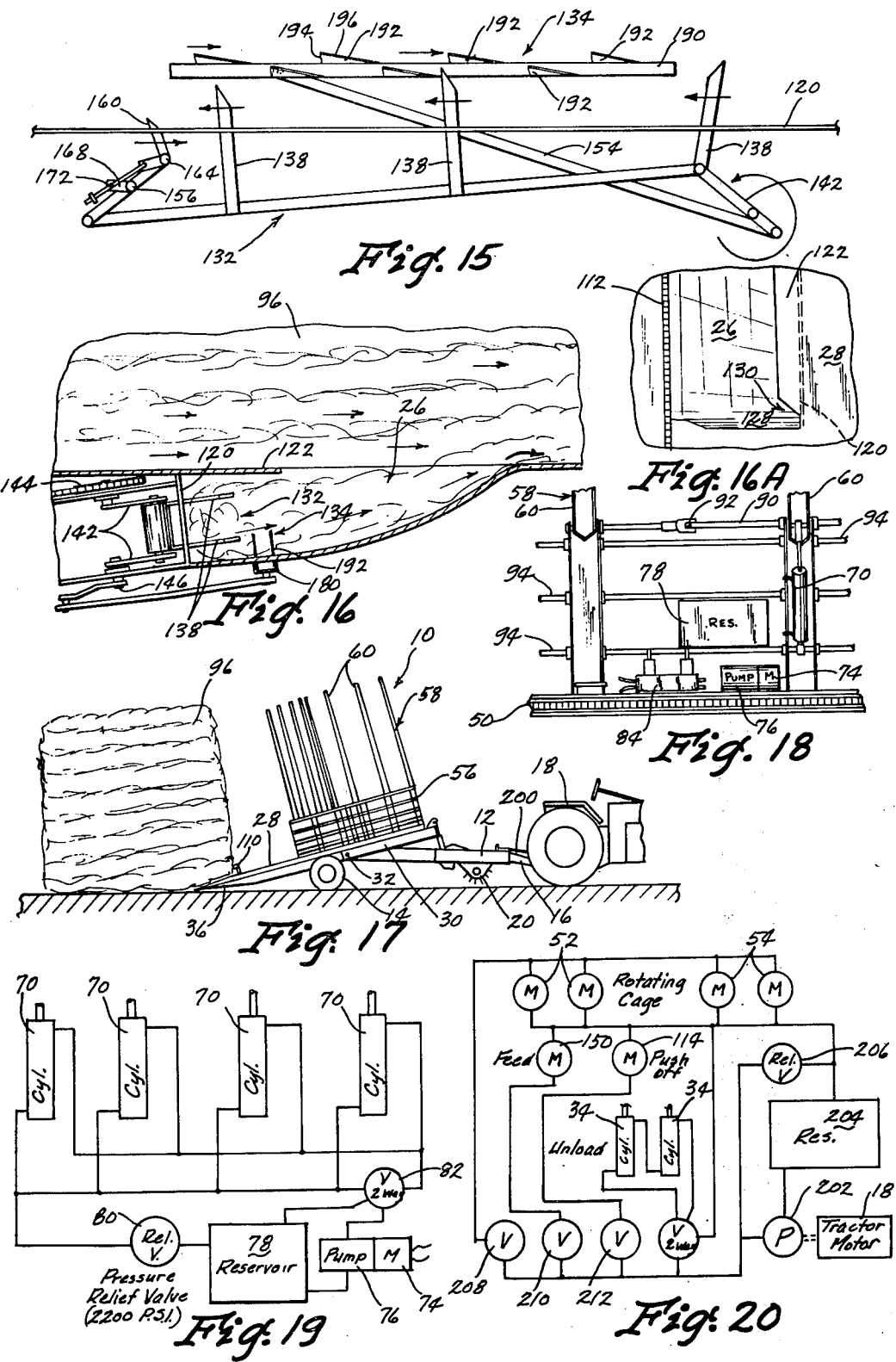

MACHINE AND METHOD FOR STACKING HAY

CROSS REFERENCE TO RELATED APPLICATION

This application is a continuation-in-part of U.S. application Ser. No. 546,385, filed Feb. 3, 1975, now U.S. Pat. No. 4,022,004.

BACKGROUND OF THE INVENTION

The making of hay for animal fodder has utilized many labor saving machines. Pick up hay balers are used to pick up hay located in windrow and make rectangular bales. Twine or wire is used to maintain the shape of these bales. In recent years the trend has been toward storing hay in larger units as compared with the smaller bales previously commonplace and capable of being carried by one person. These larger units are mechanically made with machines which roll the hay in large cylindrical or round bales having a diameter of about 6 feet and a weight of about 1,500 pounds. Another method of making larger units uses hay stacking wagons. These wagons are larger boxes which collect hay in a pile. Hay pick up and blower or conveyor structures are used to move hay to the top of the box. When the box is full of hay, the entire stack of hay is removed from the box to a storage location. An example of this machine is disclosed by Anderson and Neukom in U.S. Pat. No. 3,720,052. Another machine for stacking hay is disclosed by Carson in U.S. Pat. No. 3,538,696. This machine has a hay pick-up conveyor for moving hay to a platform. Sweep arms move the hay around the platform to build the stack.

SUMMARY OF INVENTION

The invention relates to a machine for making a stack of hay, straw, and like materials. The machine operates to make a circular stack of hay by building the stack from the bottom up. The machine has a platform upon which the stack of hay is built and supported. First means associated with the platform direct hay from the outer edge of the platform toward the center of the platform an in a circular path onto the top of the platform. A hay feeding mechanism moves the hay along the first means toward the center of the platform. Second means in the center of the platform moves hay in an upward direction to build up the center of the stack. A cage assembly rotatably mounted on the platform is moved around the platform with drive motor means as hay is moved to the platform. Arm means movably mounted on the cage assembly extend over the platform to compress and move hay in a circular path. Biasing means cooperate with the arm means to apply a downward force on the hay on the platform. The compression applied to the hay by the arm means is constant and applied consistently from the time the hay first enters the platform until the stack is complete. This makes the stack with uniform density and firmness, which allows the stack to breathe. Hay with more moisture content can be stacked as compared to bales making possible earlier stacking. The leaves and stems of the hay are kept intact. The top of the stack has a firmly packed conical crown that keeps its water-shedding shape after curing. The center of the stack being filled with hay prevents sagging or top dimpling. Pusher means movable relative to the platform function to move the completed stack of hay from the platform. The stack resists winds and can be moved with no damage due to the interlacing of the hay during the building of the stack. In accordance with one embodiment of the invention, the hay stacking machine has a platform provided with a trough. Reciprocating means move the hay in the trough to the platform surface. An elevator means having a rotatable helical section is located in the center of the platform to move hay in an upward direction to build the center of the stack. A case assembly located around the platform has a plurality of inwardly and downwardly extending compression arms which engage the hay and cause the hay to move around the platform and pick up additional hay moving to the platform from the trough whereby the stack is formed from the bottom up. As the compression arms move to an upwardly extending angular position, their downward pressure is reduced; however, the weight of the stack is increasing, thus, maintaining the necessary weight on the incoming hay to cause it to continue the stacking operation as the cage assembly is rotated. Upon the stack being completed on the platform, a pusher mechanism is actuated which moves from the front edge of the platform to the rear, pushing the stack off the platform onto the ground. The platform has been tipped rearwardly and downwardly such that gravity assists in the removal of the stack from the platform. The platform is then returned to the horizontal position as the machine is moved away from the stack and is now ready to form another stack of hay.

The invention includes a method of making a stack of hay or like material with a machine having a platform with an upper surface and a space for accommodating hay extended from the outer edge to the center area of the platform. This method includes moving hay into the space from the outer edge toward the center area of the platform. Hay moved to the center area of the platform is elevated or raised to build up the center of the stack. The hay in the space is also moved from the space onto the upper surfce of the platform along the length of the space. The hay on the upper surface of the platform is moved in a generally circular path to build a stack of hay from the bottom up. Even and continuous pressure is applied to top portions of the hay during the building of the stack. When the stack is completed it is removed from the platform.

DESCRIPTION OF DRAWINGS

FIG. 1 is a fragmentary perspective view of a first embodiment of the hay stacking machine of this invention.

FIG. 2 is a side elevation view thereof.

FIG. 3 is a top plan view thereof.

FIG. 4 is a cross sectional view taken along line 3—3 in FIG. 3.

FIG. 5 is a cross sectional view taken along line 5—5 in FIG. 4 and illustrates the operation of the compression arms.

FIG. 6 is a cross sectional view taken along line 6—6 in FIG. 5.

FIG. 7 is an enlarged cross sectional view illustrating the rib and groove slidable connection between the cage and the platform.

FIG. 8 is a cross sectional view taken along line 8—8 in FIG. 7.

FIG. 9 is a fragmentary top plan view of the platform illustrating the push-off mechanism.

FIG. 10 is a cross sectional view taken along line 10—10 in FIG. 9.

FIG. 15 is a view similar to FIGS. 11 and 14 showing the feeding means in still further positions.

FIG. 16 is a cross sectional view of the platform illustrating the feeding means in the trough leading to the platform.

FIG. 16A is a fragmentary top plan view of the feed trough in the platform.

FIG. 17 is a reduced in scale side elevation view illustrating the unloading of the platform by tipping the platform downwardly and rearwardly.

FIG. 18 is a fragmentary side elevation view illustrating the power system for the compression arms.

FIG. 19 is a schematic view of the power system for the compression arms.

FIG. 20 is a schematic view of the hydraulic system operating the other mechanisms in the hay stacker.

DESCRIPTION OF PREFERRED EMBODIMENTS

Figure 11:
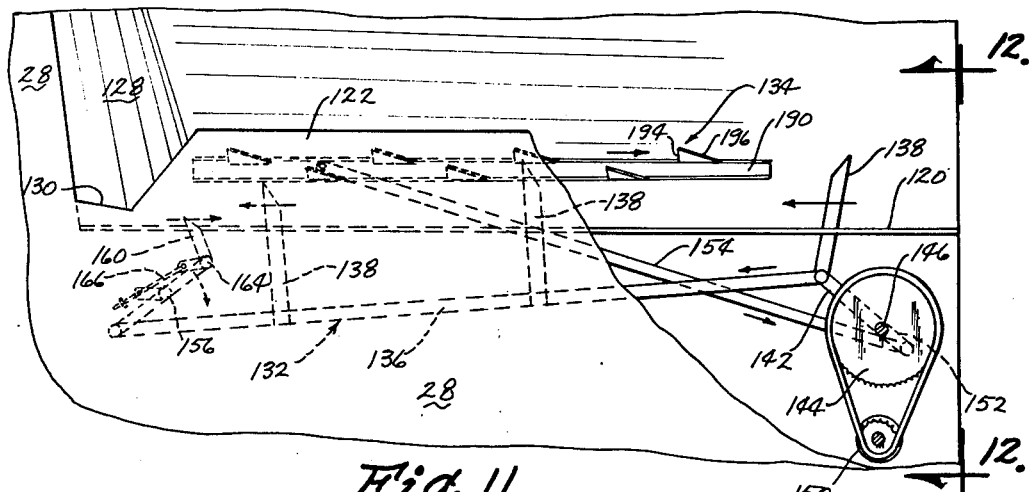
FIG. 11 is a fragmentary top plan view of the platform illustrating the reciprocating vertical and horizontal feed means.
Figure 12:
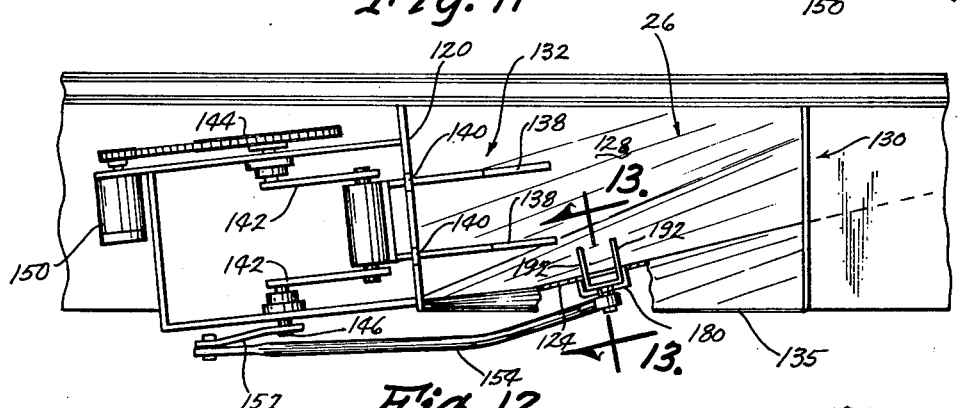
FIG. 12 is a cross sectional view taken along line 12—12 in FIG. 11.
Figure 13:
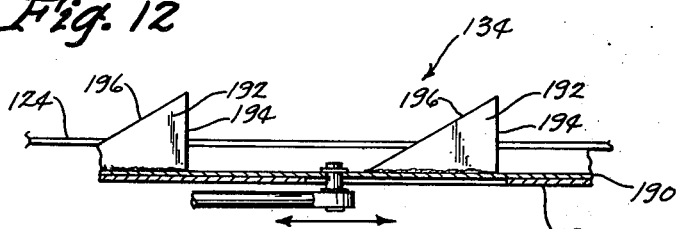
FIG. 13 is a cross sectional view taken along line 13—13 in FIG. 12.

The hay stacking machine referred to generally in FIG. 1 at 10 has a frame 12 having wheels 14 and a tongue 16 for attachment to a tractor 18. Frame 12 at its forward end carries a pickup rake 20 which feeds hay to a screw conveyor 22 having oppositely disposed flights for moving hay to the center thereof to be fed through a roller compressor 24 just prior to being fed into a feeding trough 26, as seen in FIG. 16A, in a circular table or platform 28.

Platform 28 is carried on frame 12 by side frame members 30 being pivoted at 32. Power cylinders 34 connected to frame 12 operate to tilt platform 28 between a loading and transport position and an unloading position. An unloading apron 36 is positioned rearwardly of circular platform 28 on which the stack of hay 96 is formed.

Platform 28 in FIGS. 5 and 7 has an annular channel 38 around its outer periphery which slidably and rotatably receives a slide block 40 of plastic material such as Ryerson 12, Ryerson & Sons, Chicago, Ill. Slide block 40 is attached to an annular cage or frame 42 by bolts 44. An outwardly facing channel 46 is provided on the annular frame 42. A plurality of spaced apart teeth 48 attached to channel 46 engage a drive chain 50. Chain 50 is powered by a pair of hydraulic motors 52 mounted on the front end of platform 28, as seen in FIG. 3, and a pair of drive motors 54 mounted on the rear end of platform 28 to provide continuous rotation of the annular frame 42. Frame 42 supports a plurality of spaced apart upright posts 56. A compression is movably mounted on each post. Each compression arm 58 includes an upper arm 60 pivotally connected with pin 62 to the top of post 56 and a lower arm 64 pivotally connected with pin 66 to post 56 adjacent platform 28. The inner end of lower arm 64 is pivotally and slidably connected to upper arm 60 and moves in a track 67 attached to upper arm 60. Arm 60 is raised and lowered in response to operation of a hydraulic cylinder 70 extending between post 56 and the outer end portion 72 of arm 60. Arm 60 is V-channel shaped in cross section, as seen in FIG. 6, to provide maximum strength with minimum weight. As shown in FIG. 5, the maximum downward pressure on hay 96 on platform 28 occurs when the compression arms 58 are extending generally laterally outwardly. Minimum pressure is applied to hay 96 when the arms 58 are extending substantially upwardly due to the outer end portion 72 being shorter when the compression arms 58 are extending upwardly.

Compression arms 58 are operated by the power cylinders 70, as seen in FIG. 19, which are in a separate system from other operational systems of the hay stacking machine. An electric motor 74 powered from tractor 18 drives a pump 76 in communication with a reservoir 78 connected to a relief valve 80 set at 2200 p.s.i. such that this pressure is maintained in each of the cylinders 70 at all times. Two-way operation of the cylinders 70 is possible through the two-way control valve 82. Continuous operation of the motor 74 and pump 76 is avoided by temporary operation occurring at every revolution of platform 28 by operation of a switch actuator 84, as seen in FIG. 18. Thus, if the pressure has fallen below the 2200 p.s.i. level it will be automatically brought back up each revolution of platform 28.

Each power cylinder 70 operatively operates three compression arms 58 through a laterally extending drive shaft 90 having a universal joint 92. Posts 56 are further interconnected by fencing pipes 94 to form a cage for the stack of hay 96. Lower arms 64 carry enlarged trapezoidal pressure plates 100 which assist in shaping stack of hay 96 and applying uniform pressure to it as the stack of hay is being formed. The pressure provided by compression arms 58 on the hay being fed to platform 28 is particularly important in the early forming stages when the hay weight is small in order to maintain the sweeping action of the hay on platform 28, which picks up hay coming from trough 26. As the stack of hay 96 grows and its weight increases the problem is less and the pressure applied by the compression arms 58 becomes less due to the change in length of the lever arm of end portion 72.

As shown in FIG. 3, a plurality of rails 94 are mounted on posts 56 to form a circular cage around platform 28. The cage has two gate sections 104 which can swing outwardly to the dash-line position of FIG. 3 away from the supporting annular frame 42. Rails 94 are pivoted through sleeves 106 slidably and rotatably embracing vertical tubular posts 108. A conventional latch 107 is employed for locking the free ends of the gates 104 together in their closed position.

The push-off arm for the hay stack 96 is best seen in FIGS. 3, 9 and 10 and includes an arcuate member 110 connected at its opposite ends to a pair of drive chains 112 recessed in platform 28. Drive chains 112 are powered by a hydraulic motor 114 connected to a shaft 116 by a sprocket chain 118, as seen in FIG. 9. Thus it is seen that operation of the push-off member 110 moves the member across through 26 to the rear end of platform 28 whereupon it is then returned to the forward end adjacent annular frame 42 ready for the next push-off operation.

Trough 26 is best seen in FIGS. 3, 11, 12, 16 and 16A and includes a longitudinally extending vertical side wall 120 positioned under a platform wall portion 122. A bottom wall portion 124 extends from the lower edge of the vertical wall 120 laterally to merge at 126 with the top surface of platform 28, as seen in FIG. 16. The forward end of trough 26 is defined by a forwardly and upwardly extending portion 128 which merges into the top surface of platform 28. A laterally extending slot 130 is formed at the forward end of platform portion 122 and extends to substantially the vertical wall 120, as seen in FIG. 11. Trough 26 is provided with an inlet mouth opening 130 at the outer peripheral edge of platform 28 and this opening is adapted to communicate with a feeding apron 135 which receives a flattened layer of hay from the compressing roller 24, as seen in FIG. 3.

The hay, as seen in FIG. 16, is fed from mouth opening 130 in trough 26 to platform 28 by reciprocal operation of staggered vertical and horizontally oriented feed means 132 and 134, respectively. Feed means 132 includes an elongated frame member 136 along which are spaced U-shaped teeth 138 adapted to extend through the vertical wall 120 utilizing the slots 140 formed in the wall. A pair of crank arms 142 carried on shafts 146 rotate in response to a drive sprocket 144 driven by a hydraulic motor 150. A further crank arm 152 is connected to the shaft 146 and extends in the opposite direction therefrom, as seen in FIG. 11. Crank arm 152 is then connected to an elongated link member 154 for reciprocally operating the feeding means 134 which is 180° out of phase with the feeding means 134.

Figure 14:
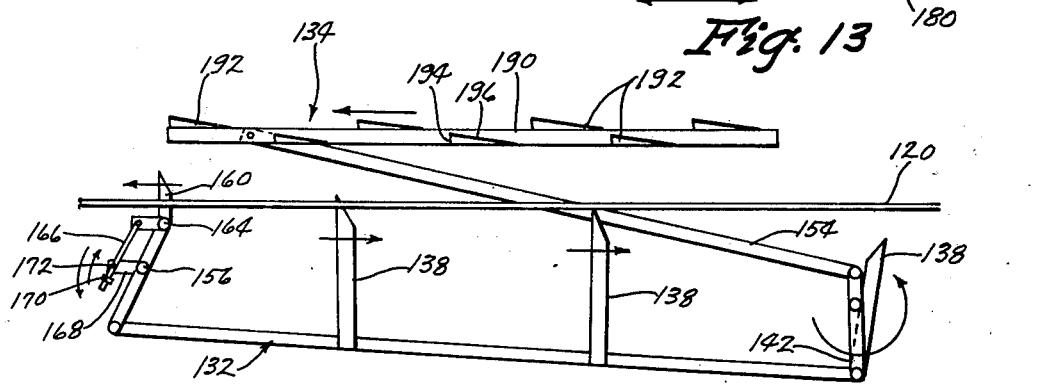
FIG. 14 is a view similar to FIG. 11 but illustrating the feeding means in different positions.

The forward end of feed means 132 is pivotal about an axis of shaft 156 connected to a link 158 in turn having a tooth 160 with a perpendicularly extending arm 162 pivotally connected thereto at 164. An adjustable rod 166 connects the outer free end of the link 162 to a link 168 connected at the pivot shaft 156. Rod 166 includes an adjustable nut 170 and is adapted to slidably move through an ear 172 such that tooth 160 is free to pivot forwardly when the feeding means 132 is on the out phase of each revolution of crank arm 142 whereby tooth 160 moves under the hay. On the other hand, when feed means 132 is moving forwardly to the left, as seen in FIG. 14, rod 166 limits clockwise pivotal movement of the tooth and thus the hay is moved to the left or forwardly onto platform 28. The other teeth 138 reciprocate in and out of wall 120, as seen in FIGS. 11, 14 and 15, and thus on the out phase of crank 142 revolution the teeth are withdrawn from the trough and on the feeding phase of the revolution the teeth are in the trough as seen in FIGS. 11 and 15 pushing hay onto the platform from the trough, as seen in FIG. 16.

The vertically arranged feeding means 134, as previously indicated, is 180° out of phase and thus when it is on the outtake feeding means 132 is on the intake moving hay forwardly. Feeding means 134 includes a guide channel 180 welded to the bottom wall 124 of the trough 26. An elongated plate member 190 is positioned below the bottom wall 124 in the channel 180 and carries a plurality of spaced apart teeth 192 having forward vertical edges 194 and rearwardly tapering smooth edges 196 such that when teeth 192 are moving forwardly in the trough towards the platform the forward edges 194 grip the hay and move it forwardly but when feeding means 134 is moving to the right or outwardly the smooth edges 196 slide under the hay with no affect thereon.

The power for operating the rake 20, auger 22 and compressing roller 24, is supplied by the power takeoff drive shaft 200 driven by the tractor 18. The power takeoff also drives a pump 202, as seen in FIG. 20, which in turn is connected to a reservoir 204 and relief valve 206 for operation of the unloading power cylinder and rotating cage motors 52 and 54. Feed motor 150 for the feeding means 132 and 134 is also driven by the pump 202 as is the push-off motor 114. The rotating cage motors are operated by a control valve 208 while the valve 210 operates the feed motor 150 and the push-off motor 114 are operated by the valve 212.

Thus it is seen in operation that the tractor 18 pulls the hay stacking machine 10 along picking up hay 220 on the ground through the pickup rake 20 which feeds it to the auger 22 having inwardly directing flights in turn directing the hay then to the compressing roller 24 which feeds it onto the apron 135 adapted to register with the inlet trough opening 130 at the exterior peripheral edge of the table 28. It is seen that this communication is established only when the table 28 is in its loading or transport position of FIG. 1 and is broken when the table is tilted to the unloading position of FIG. 17. The hay continues its travel into the trough 26 where it is fed along the trough by the reciprocating out of phase feed means 132 and 134 in the vertical trough wall 120 and bottom wall 124. Each of these feed means are substantially covered by the platform wall portion 122 which allows the hay in the trough 26 to be fed onto the platform 28 at the forward end of the trough by the hay moving upwardly along the forward trough wall 128, as seen in FIG. 11, and through the laterally extending notch 130 in platform wall portion 122. Notch 130 extends to substantially the vertical trough wall 120. The side of the trough opposite the wall 120 is formed by the merging of the bottom wall 124 with the top surface of platform 28, as seen in FIG. 16. With the hay on the platform 28 the compression arms 58 having portions 60 and 64 extend downwardly onto the hay 74 to compress it against platform 28 and cause it to sweep the hay coming out of the trough 26 up and onto platform 28 thereby building the stack of hay 96 from the bottom up as frame 42 carrying the compression arms 58 rotates about platform 28. The rotation of frame 42 includes the cage of pipes 94. When stack of hay 96 is completed the cage, which has been continuously rotating, is stopped with gates 104 facing the rear over unloading apron 36 and then the unloading cylinders 34 operated to tip platform 28 downwardly at the rear end, as seen in FIG. 17 whereupon the push-off member 110 is operated and moves from the front of platform 28 to the rear taking with it the stack of hay 96. The push-off member 110 is then returned to the forward end of platform 28 ready for the next unloading operation. Platform 28 is returned to its horizontal transport and loading position and the gates 104 are swung closed. The compression arms 58 are again ready to act upon the next hay fed from trough 26 to the center of platform 28. It is seen in FIG. 3 that the inner ends of the upper compression arms 58 all converge at the center of platform 28 which also is at the slot 130 such that the compression arms 58 readily engage the hay and begin the revolution thereof over platform 28 surface 28 as the cage rotates in a counterclockwise fashion.

It is appreciated that positive control is maintained over the feeding of the hay onto platform 28 such that it can be proportioned under the stack and distributed evenly thus causing the stack to grow or rise on an even basis. The stack is formed independently of the operator of the pulling vehicle. The windrow of hay 220 may pass under any portion of the pickup rake 20 and in any event it will be funneled by the screw conveyor 22 through the restricted passageway through the roller compressor 24 onto the apron 135 and then into the trough 26 through the inlet mouth opening 130. Accordingly, the stack will grow uniformly avoiding tearing action that might otherwise occur and thus maintain its capability of staying intact when the stack of hay is being unloaded.

A second embodiment of the material stacking machine, or hay stacking machine, of the invention is shown in FIGS. 21 to 30. The machine, indicated generally at 300, is operable to pick up fibrous material from a location and build the fibrous material into a firm stack from the bottom up. The fibrous material can be hay, straw, cornstalks, flax, straw, and the like. the material identified in the following description is identified as hay. It is understood that other types of materials can e formed into a stack with the machine of the invention.

Figures 21, 22:
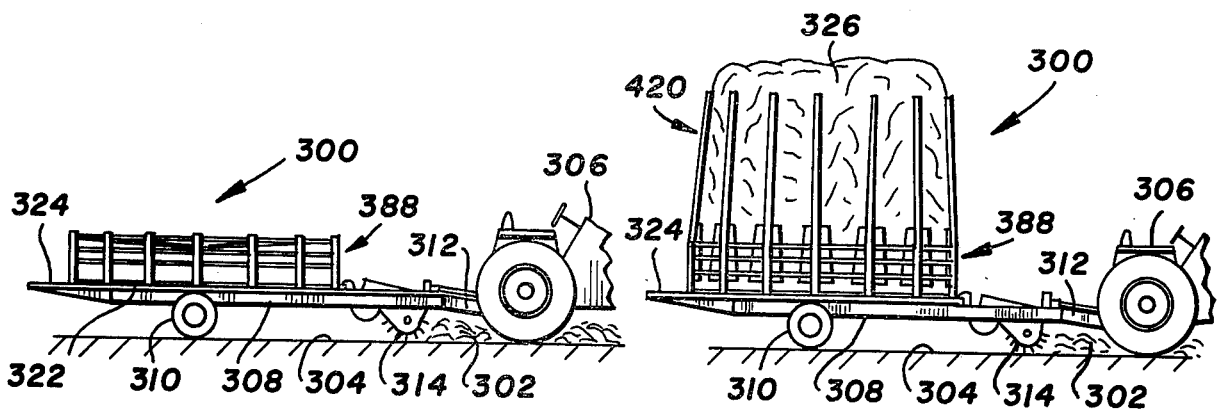
FIG. 21 is a side elevational view of a second embodiment of the hay stacking machine of the invention in the empty condition.
FIG. 22 is a view similar to FIG. 21 showing a completed stack of hay on the machine.

As shown in FIGS. 21 and 22, hay 302 is located in a long windrow on the ground 304. Machine 300 is connected to a tractor 306 operable to move machine 300 along the ground to pick up the hay and build the stack. Machine 300 has a longitudinal rectangular frame 308 supported on the ground with two sets of wheels 310. A forwardly directed tongue 312 is secured to the front end of 308. Tongue 312 is connected in a conventional manner to the draw bar of tractor 306.

A material pickup unit 314, shown as a rotary pickup rake, extends transversely across the front of frame 308. On forward motion of the machine 300 pickup unit 314 operates to gently pick up the hay from the windrow and move the hay rearwardly to a centering screw conveyor 316. The screw conveyor 316 moves the hay to the center line of the machine into a feed roller 318. Power units (not shown), as hydraulic motors connected to the hydraulic system of tractor 306, function to operate the pickup unit 314, screw conveyor 316, and feed roller 318.

Figure 24:
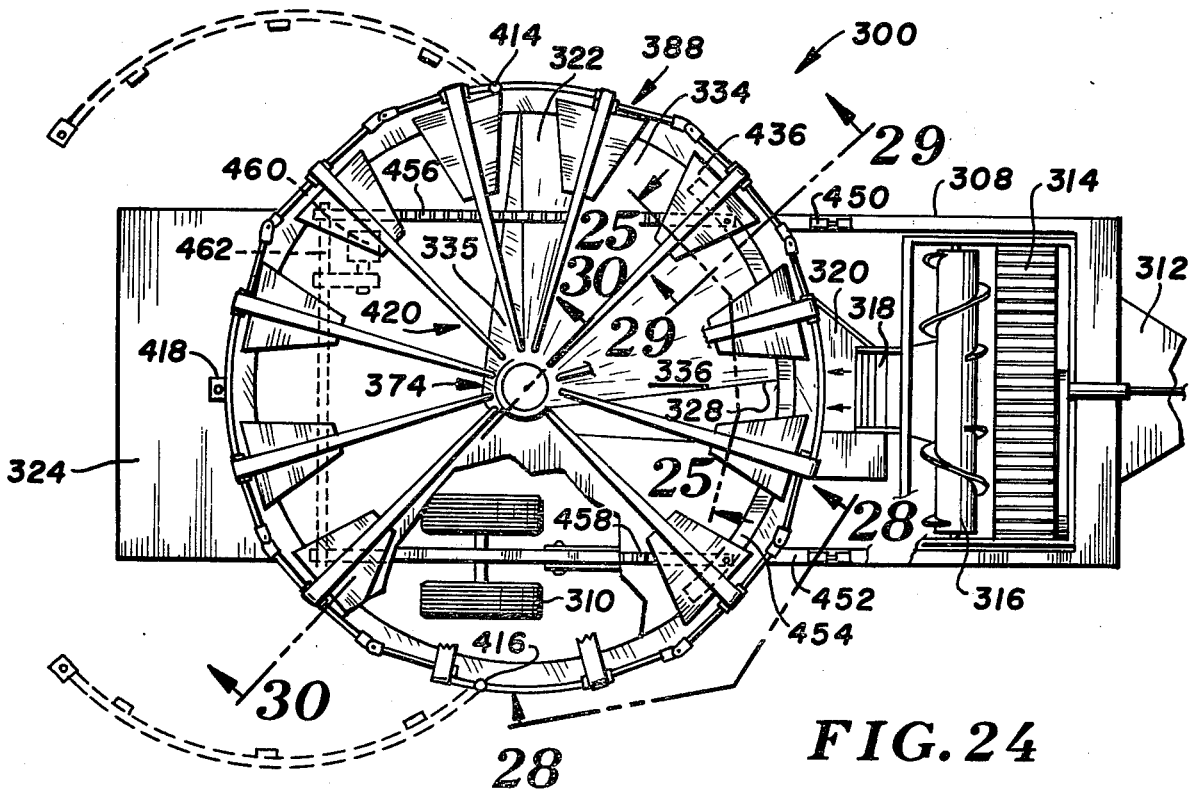
FIG. 24 is an enlarged plan view of the machine of FIG. 21.

A rearwardly directed tubular chute 320 is located behind the feed roll 318. Chute 320 has an inlet passage that guides the hay to an area below the outside edge of a generally horizontal platform 322. As shown in FIG. 24, platform 322 has a circular configuration and a generally flat top or upper surface. A rearwardly directed rectangular apron 324 is located behind platform 322. The stack of hay 326 is built and supported on platform 322.

Figure 25:
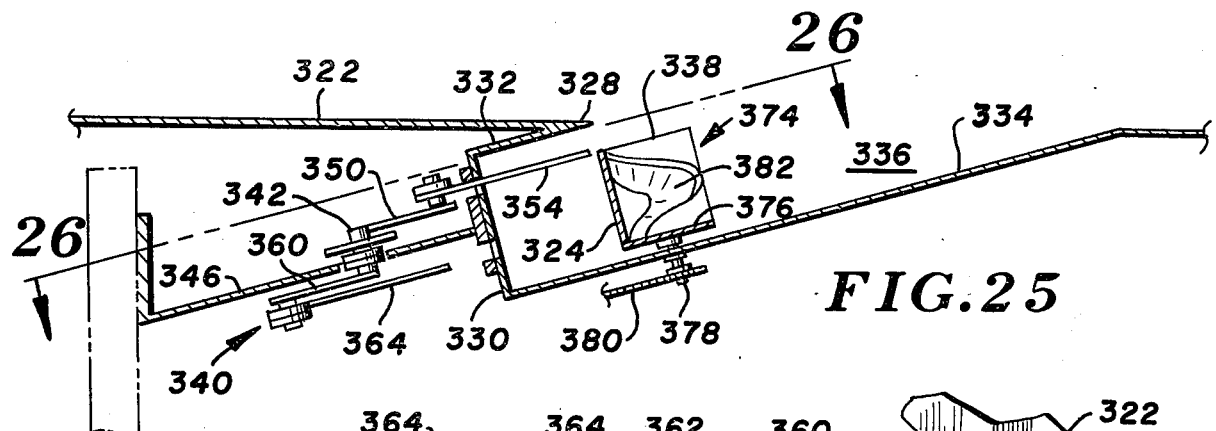
FIG. 25 is an enlarged sectional view taken along line 25—25 of FIG. 24.
Figure 26:
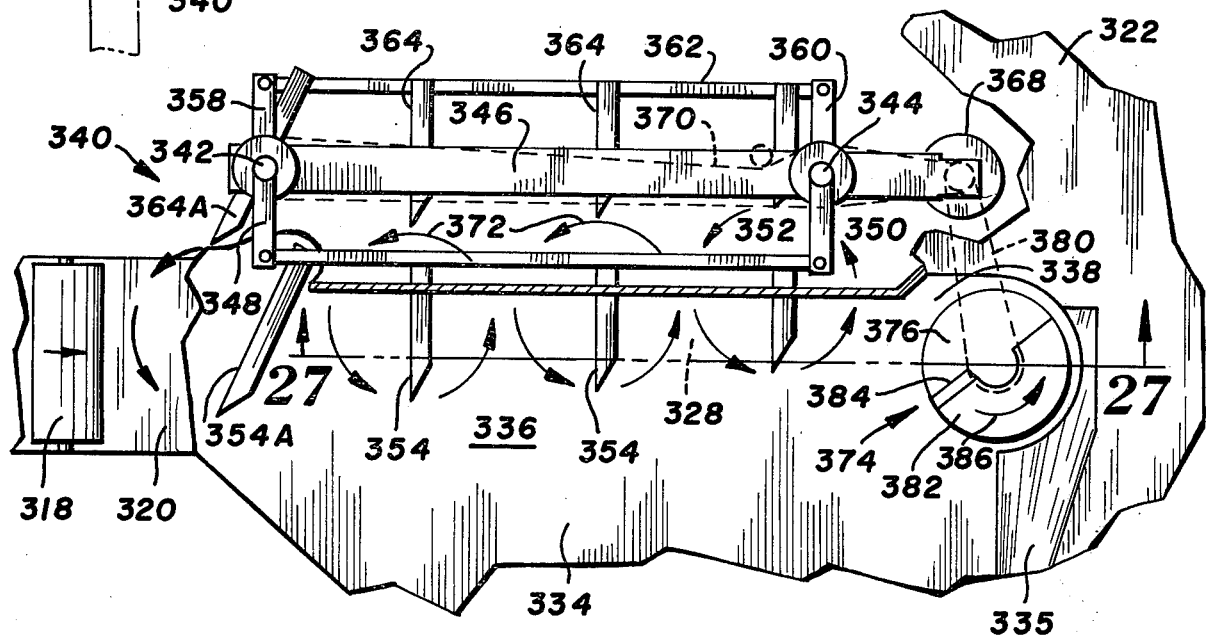
FIG. 26 is an enlarged sectional view taken along line 26—26 of FIG. 25.
Figure 27:
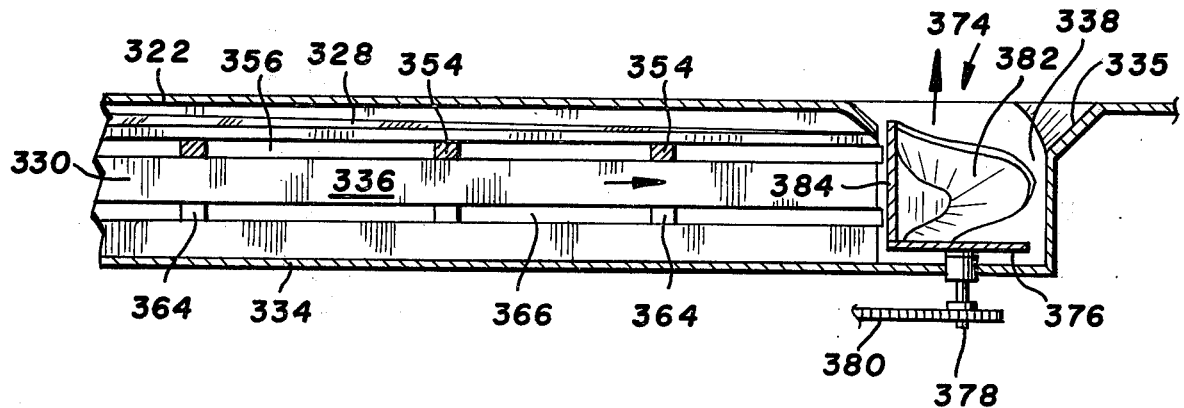
FIG. 27 is a sectional view taken along line 27—27 of FIG. 26.

Referring to FIGS. 25 to 27, the forward sector of platform 322 has a circumferential lip or ledge 328. Ledge 328 extends from the center area of the platform to its outer periphery. The ledge 328 is in alignment with the mid-part of chute 320. A generally upright wall 330 is located below lip 328. An inclined plate 332 connects the upper end of wall 330 to the outer edge of lip 328. The lower end of wall 330 is connected to an inclined ramp or bottom wall 334. Bottom wall 334 inclines upwardly in a circumferential direction away from wall 330 and merges with an inclined surface 335. Surface 335 joins the upper surface of platform 322. Walls 330 and 334 form an elongated radially extended depression space or feeding trough 336. The trough 336 has an elongated space that is coextensive with the passage of chute 320 and extends from the outer peripheral edge of platform 322 to a pocket 338 in the central area of platform 322. Pocket 338 has an open top or upper end.

A hay feeding mechanism indicated generally at 340 picks up the hay from the inlet passage chute 320 and moves the hay in a longitudinal rearward direction or radial direction toward the center of platform 322. The hay moves along trough 336 in response to operation of the hay feeding mechanism 340. Hay also moves in a circumferential direction up the inclined bottom wall 334 and inclined surface 335 to the top surface of platform 322 to build up the stack from the bottom up.

Hay feeding mechanism 340 has a pair of spaced upright shafts 342 and 344 rotatably mounted on opposite portions of a support 346 secured to the platform frame. As shown in FIG. 26, a first laterally directed arm 348 is secured to the upper end of shaft 342. A similar laterally directed arm 350 is secured to the upper end of shaft 344. A cross bar or link 352 is pivotally connected to the outer ends of the arms 348 and 350. Forwardly directed teeth 354 are attached to spaced portions of bar 352. The first tooth 354A extends forwardly and outwardly into the trough 320. Tooth 354 functions to move the hay from the passage of chute 320 in a longitudinal and circumferential direction in space 336. As shown in FIG. 27, teeth 354 extend through a longitudinal slot 356 in side wall 330 and are 180° out of phase with teeth 364.

Rearwardly directed arms 358 and 360 are secured to the lower ends of shafts 342 and 344 respectively. A tie bar or link 362 is pivotally connected to the outer ends of arms 358 and 360. Forwardly directed teeth 364 are secured to spaced portions of bar 362. The first tooth 364A extends in a forward and outward direction. Teeth 364 are adapted to extend through a lower elongated slot 366 in side wall 330.

Shafts 343 and 344 are rotated with a motor 368, such as a hydraulic or electric motor. A link chain 370 drivably connects the motor 368 with the shafts 342 and 344 whereby on operation of motor 368 the teeth 354 and 364 move in a generally circular path as indicated by arrows 372 and sequentially move into and out of the feeding trough 336. The alternating reciprocating movement of the teeth 354 and 364 continuously moves the hay from the inlet passage of chute 320 into the feeding trough 336.

A portion of the hay moved into the trough 336 is moved to the center area of platform 322 and engages an elevator means indicated generally at 374. Elevator means 374 operates to move the hay in an upward direction to fill and form the center portion of the stack of hay. Elevator means 374 has a circular base plate 376 located at the bottom of the pocket 338. A downwardly directed shaft 378 rotatably mounted on the bottom wall 334 is secured to the center of plate 376. A chain and sprocket drive 380 drivably connects motor 368 with shaft 378, whereby on operation of the motor 368 the feed mechanism 340 and elevator means 378 are simultaneously rotated at substantially the same speed. An upwardly directed helical flight 382 is secured to the top of plate 376. Flight 382 is approximately a 180° helical segment, having a lower edge secured by welds or the like to a radial portion of plate 376. The upper end of flight 382 is secured to an upright support plate 386. The bottom of support plate 386 is secured by welds or the like to plate 376. On operation of motor 368 the chain and sprocket drive 380 rotates the helical flight 382 in the direction of the arrow 386. This forces the hay in an upward direction out of pocket 338. Feed mechanism 340 continuously moves portions of hay into the pocket 338 whereby the elevator means 374 will continuously build up the center portion of the stack of hay.

Returning to FIG. 24, an annular cage assembly indicated generally at 388 surrounds the platform 322. Cage assembly 388 rotates in a counter-clockwise direction carrying the hay in a circumferential direction or circular path. Cage assembly 388 moves the entire stack so that the hay in the feeding trough 336 is moved up the inclined bottom wall 334 and inclined surface 335 onto the top surface of platform 322 to build the stack up from the bottom.

Figure 29:
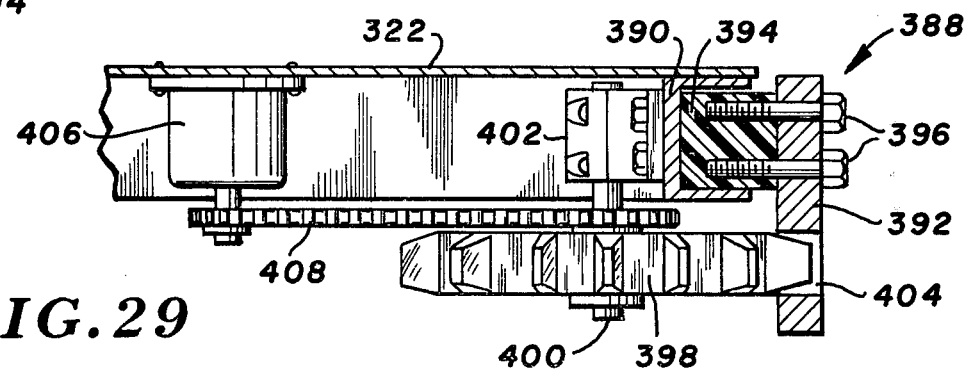
FIG. 29 is an enlarged sectional view taken along line 29—29 of FIG. 24.

Referring to FIG. 29, a channel beam or ring 390 is secured to the outer edge of platform 322. Channel ring 390 opens in an outward direction and extends around platform 322. Cage assembly 388 has an annular band 392 surrounding the outside of channel ring 390. A plurality of sliding support blocks 394 extended into the channel ring 390 are secured to band 392 with a plurality of bolts 396. Blocks 394 support the cage assembly 388 on channel ring 390 and allow the cage assembly 388 to rotate relative to the ring 390 around platform 322.

The drive means for cage assembly includes a drive sprocket 398 secured to an upright shaft 400. A bearing block unit 402 rotatably supports the shaft 400 on channel ring 390. Band 392 has a plurality of circumferentially spaced holes 404 adapted to receive the teeth of the drive sprocket 398. The sprocket 398 is driven with a motor 406, as an electric or hydraulic motor. A chain and sprocket drive 408 drivably connects motor 406 to the shaft 400 whereby on operation of the motor 406 the sprocket 390 rotates. This drives the entire cage assembly 388 around platform 322. A plurality of driven sprockets, similar to sprocket 398, can be used to drive the band 392. Other types of drive mechanisms can be used to rotate cage assembly around platform 322.

Figure 28:
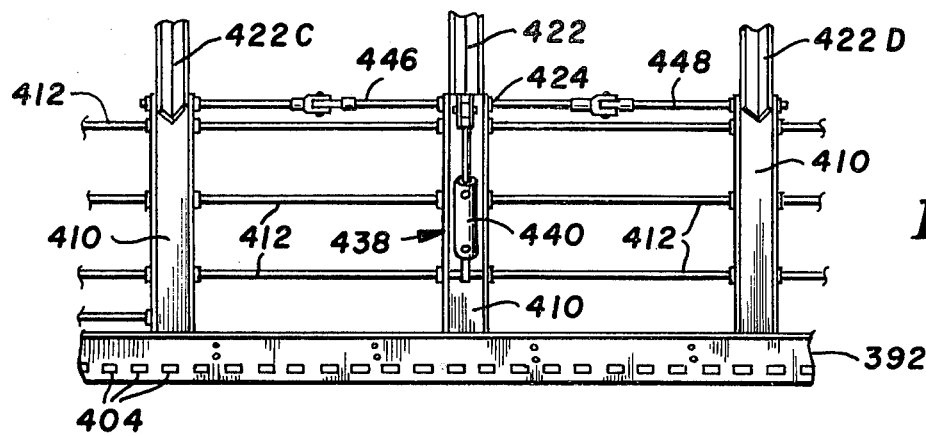
FIG. 28 is a side elevation view along line 28—28 of FIG. 24 looking in the direction of the arrows.

Referring to FIG. 28, a plurality of circumferentially spaced upright posts 410 are secured to band 392. Vertically spaced members 412, as straps or pipes, inter-connect adjacent posts 410 to define a fence or caged area around platform 322.

Referring to FIG. 24, rear sections 388A and 388B of cage assembly 388 are pivoted at hinged units 414 and 416 whereby the rear part of the cage assembly 388 can be opened as shown in broken lines to allow the completed stack to be moved from the platform onto a storage location, such as the ground. The rear sections 388A and 388B of cage assembly 388 are adapted to be secured together with a lock 418. The lock 418 can be a clevis unit adapted to receive a removable pin.

Arm means indicated generally at 420 movably mounted on the posts 410 extend over platform 322. Arm means 420 engage portions of the hay 326 on the platform to hold the hay during the forming of the stack on platform 322. As shown in FIG. 24, a plurality of arms extend in the generally radial direction from posts 410 to the center of area of platform 322. Preferably, 12 arms are circumferentially spaced around platform 322. The number of arms used to apply pressure on the hay 326 can vary.

Figure 30:
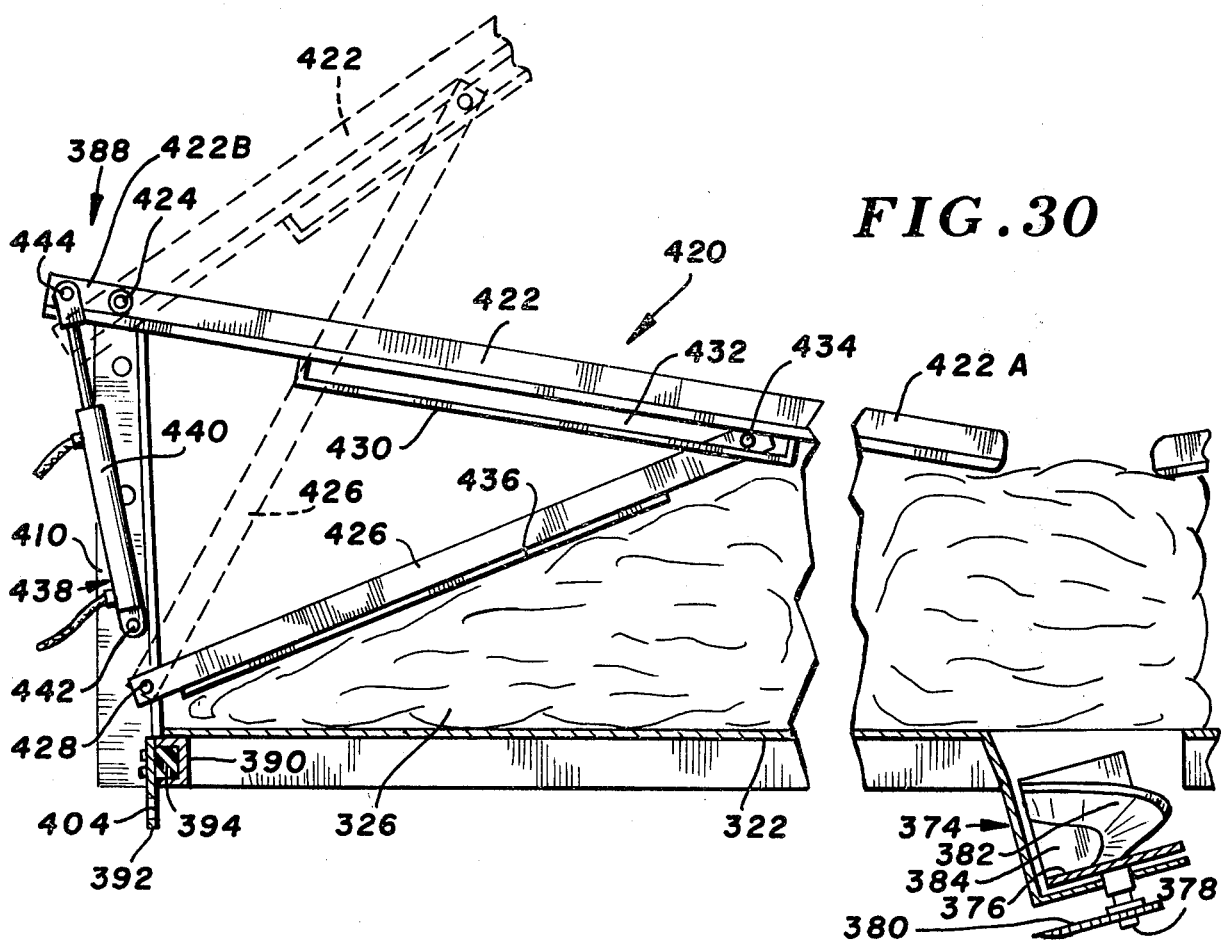
FIG. 30 is an enlarged foreshortened sectional view taken along line 30—30 of FIG. 24.

Referring to FIG. 30, each arm of arm means 420 comprises a first or upper elongated arm 422, having an inner end 422A adjacent to the center area of platform 322 on an outer end 422B. Outer end 422B of the arm is pivotally connected to the upper end of posts 410 with a pivot pin 424. A second or lower arm 426 is located below arm 422. A pivot pin 428 connects the outer end of arm 426 to the lower end of posts 410. The inner end of arm 426 is slidably mounted on arm 422 with a slide member 430. Slide member 430 defines an elongated longitudinal slot 432. A transverse slide member or pin 434 located in slot 432 movably connects the inner end of arm 426 to the mid-portion of the upper arm 422.

A generally flat plate 436 is secured to the inside surface of the lower arm 426. As shown in FIG. 24, plate 436 has a generally trapezoidal shape with the side walls converging toward the center of platform 322.

Arm means 422 and 426 are biased in a downward direction by a biasing means indicated generally at 438. Biasing means comprises a fluid operated means 440, shown as a cylinder and piston assembly. A lower pin 442 pivotally connects the lower end of the fluid operated means 442 to posts 410. The upper end of the fluid operated means 440 is connected with a pin 444 to the outer end 422B of upper arm 422. The fluid operated means 440 operates to selectively expand or contract to change the angular position of arms 422 and 426. The fluid pressure for the fluid operated means can be derived from a pump driven by an electric motor. The fluid circuit can be the fluid circuit that is disclosed in FIG. 19. The pump and motor are mounted on the platform 322 or band 392 so as to rotate with the cage assembly 388. The switch actuator 84 mounted on platform 322, shown in FIG. 18, is adapted to receive a stationary contact connected to the electrical system of the tractor. Switch actuator 84 will engage the stationary contact one time during each revolution of the cage assembly 388. This provides power to the electric motor, thereby driving the pump 75. The pump 76 moves the fluid from reservoir 78 to the fluid operated means, thereby changing the angular position of the arm means 420. Other types of fluid supply circuits can be used to supply fluid under pressure to the fluid operated means 440.

A plurality of fluid operated means 440 are located around the cage assembly 388. Referring to FIG. 28, a first drive shaft 446 connects the pivot in 424 with the pivot pin for the arm 422C. A similar drive shaft 448 connects the pin 424 with the pivot pin for the arm 422D. The operation of the fluid operated means 440 will concurrently rotate the drive shafts 446 and 448 whereby the single fluid operated means 440 will control the angular position of the arm 422, 422C, and 422D. Biasing means 438 operates in the same manner as the hydraulic cylinder shown in FIG. 4.

Figure 23:
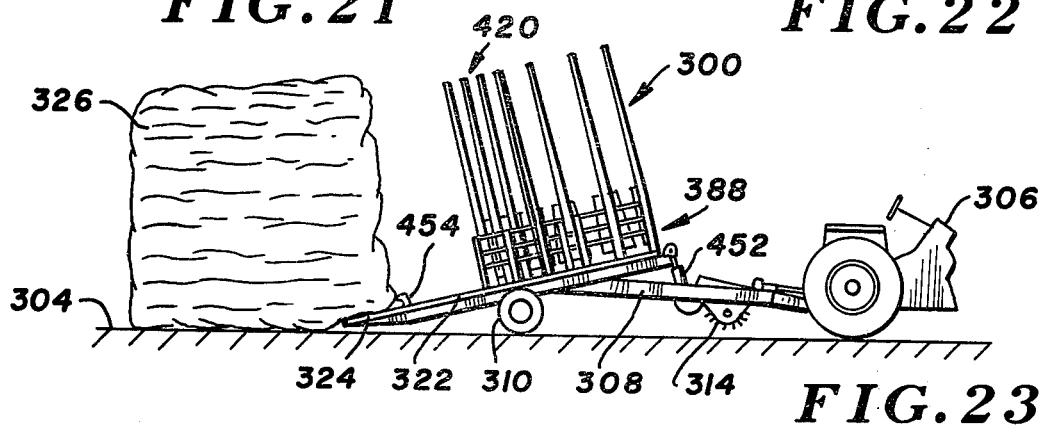
FIG. 23 is a side elevational view of the machine of FIG. 21 with the platform tilted and the stack of hay being removed from the platform.

Returning to FIG. 24, a pair of fluid cylinders 450 and 452 are mounted on frame 308 and connected to the forward portion of platform 322. Cylinders 450 and 452 operate to control the tilt position of platform 322. As shown in FIG. 23, when cylinders 450 and 452 are extended, platform 322 tilts in a rearward direction with the apron 324 located adjacent the ground 304. The stack 326 is removed from the platform 322 by opening the rear cage assembly sections 388A and 388B as shown in broken lines in FIG. 24. An arcuate pusher 454 is located adjacent the forward portion of platform 322. Pusher 454 is connected to a pair of rearwardly directed chains 456 and 458. Pusher 454 is moved in a rearward direction by operation of a motor 460, such as an electric or hydraulic motor. Motor 460 is connected to a chain and sprocket drive 462 which operates to pull the chains 456 and 458 to move pusher in a rearward direction.

In use, the material stacking machine 300 is moved along the field with a pickup unit 314 operating to pick up a windrow of hay and deliver the hay to the inlet passage of chute 320. The pickup unit is an elongated conveyor adapted to receive the hay. The hay can be fed into the pickup unit from a stationary source, or manually fed into the inlet passage of chute 320. The hay in the inlet passage of chute 320 is picked up by the fingers 354A and 364A of the reciprocating feeding mechanism 340 and moved from the outer peripheral edge area of the platform 322 toward the center of the platform in the feeding trough 336. The hay in the feeding trough 336 is moved in a circumferential or circular path in response to rotation of cage assembly 388. The hydraulic motor 406 operates to rotate the drive sprocket 398. This rotates cage assembly in the counter-clockwise direction shown in FIG. 24. Arm means 420 being mounted on the posts 410 rotate with cage assembly 388. The hay located on platform 322 is circumferentially moved with arm means 420. The hay moving over the lip 328 picks up additional hay in the feeding trough 336, whereby an additional amount of hay is moved up under the stack so that the stack is built from the bottom up.

The hay in the center portion of the stack is built up by the movement of hay in an upward direction caused by the elevator means 374. The motor 368 rotates the helical segment 382 so that hay moves to the center area of the platform is elevated to build up the center of the stack 326. Elevator means 374 operates concurrently with the feeding mechanism 340, since they are drivably connected to a common drive motor 368.

As shown in FIG. 22, the stack is built in an upward direction. Arm means 420 pivot upwardly and outwardly allowing the stacks to move or rise above platform 322. Referring to FIG. 30, as the arm means 420 pivot in an upward direction the biasing force due to the fluid operated means 440 decreases. The arm means 420 are maintained in engagement with the size of the stack, whereby the upright shape of the stack is controlled by arm means 420.

In terms of the method of making a stack of material, such as hay, with the machine of the invention, the hay is initially moved into the space or feeding trough 336. This is accomplished by operation of the feed roller 318 in conjunction with the feeding mechanism 340. The hay moves from the outer edge of platform 320 toward the center of the platform. The hay reaching the center of the platform is elevated into the center area of the stack to build up the center of the stack. Other portions of the hay are moved from the feeding trough in an upwardly and inclined circumferential direction or a circular path to form the stack from the bottom up. Pressure is applied in a downward direction on top portions of the hay during the movement of the hay in circular paths over the platform 322. The completed stack is removed from the platform by operation of the pusher 454.

While there has been shown and described the preferred embodiments of the invention and methods of making a stack of materials, such as hay, it is understood that changes in materials and structures and modifications can be made by those skilled in the art without departing from the invention. The invention is defined by the following claims.

The embodiments of the invention in which an exclusive property or privilege is claimed are defined as follows:

1. A machine for making a stack of hay and like material comprising: a platform having a top surface for accommodating a stack of hay, said platform having first means extended toward the center of the platform for receiving and accommodating hay from a supply of hay, second means associated with said platform for moving the hay relative to said first means toward the center of the platform, third means located generally in the central portion of the platform for moving hay in an upward direction to build up the central part of the stack of hay, and fourth means associated with said platform for moving hay from said first means onto said platform top surface to form a stack of hay from the bottom thereof.

2. The machine of claim 1 wherein: said first means includes wall means forming a trough in said top surface of said platform, said trough having a generally radial space for accommodating said hay.

3. The machine of claim 2 wherein: said wall means has an upwardly and circumferentially inclined bottom wall joined to the top surface of the platform whereby hay moves from said trough onto said top surface of the platform.

4. The machine of claim 1 wherein: said platform is generally circular and said first means is a trough disposed generally radially and extends from the outer peripherally of said platform toward the center thereof.

5. The machine of claim 1 wherein: said first means includes a generally horizontal lip extended in the direction of the movement of the hay from the first means, an upright side wall located below said lip, a bottom wall extend from the lower portion of the upright wall in the direction of movement of hay from the first means, said bottom wall inclined upwardly to direct hay to the top surface of the platform, said lip, side wall and bottom wall forming a trough for accommodating hay.

6. The machine of claim 5 wherein: said second means comprises finger means engageable with hay in said trough and means for moving said finger means in a direction for moving hay along the length of the trough.

7. The machine of claim 6 wherein: said side wall has elongated slots, said finger means being located adjacent the side wall and movable through said slots to move hay along the length of the trough.

8. The machine of claim 6 wherein: said finger means includes first fingers and second fingers, and means movably mounting said first and second fingers whereby on operation of the means for moving the finger means said first and second fingers sequentially engage and move said hay in said trough.

9. The machine of claim 6 wherein: said third means includes helical means for elevating hay into the center area of the stack, and means to rotate the helical means, said means to rotate the helical means being drivably connected to the means for moving said finger means whereby the helical means and finger means are concurrently moved.

10. The machine of claim 1 wherein: the second means comprises finger means for moving hay toward the center of the platform, and means for moving said finger means.

11. The machine of claim 10 wherein: said finger means includes first fingers and second fingers, and means movably mounting said first and second fingers whereby on operation of the means for moving said finger means said first and second fingers sequentially engage and move said hay in the trough toward the center of the platform.

12. The machine of claim 10 wherein: said third means comprises helical means located generally in the center of the platform for moving hay in an upward direction, and means for rotating the helical means, and common drive means for the means for moving said finger means and for rotating the helical means whereby the finger means and helical means are concurrently operated.

13. The machine of claim 1 wherein: the third means comprises helical means located generally in the center of the platform for moving hay in an upward direction and means for rotating the helical means.

14. The machine of claim 13 wherein: the second means includes movable means and drive means for moving the movable means, and power transmitting means drivably connecting the means for rotating the helical means and drive means for moving the movable means whereby the movable means and helical means are concurrently operated.

15. The machine of claim 13 wherein: the fourth means includes cage means surrounding the platform, means movably mounting the cage means on the platform, and drive means for rotating the cage means relative to the platform in the direction of rotation of the helical means.

16. The machine of claim 15 wherein: said fourth means includes compression means movably mounted on the cage means for engaging portions of the hay on said platform and yieldably maintaining pressure on said portions of the hay.

17. The machine of claim 1 wherein: said fourth means includes cage means generally surrounding said platform.

18. The machine of claim 17 including: means rotatably mounting said cage means on said platform, and means for rotating said cage means relative to said platform.

19. The machine of claim 18 including: compression means associated with said cage means and means mounting said compression means on said cage means for rotation therewith.

20. A machine for making a stack of hay and like material comprising: first means having an area for accommodating a stack of hay, first movable means for moving hay into said area of the first means and toward the center of said area, second movable means for receiving hay moved by the first movable means and moving said receiving hay in an upward direction, and means for moving hay around said area to build a stack of hay.

21. The machine of claim 20 wherein: said first means includes means providing a trough for accommodating hay, said trough extended toward the center of said area.

22. The machine of claim 21 wherein: said first movable means comprises finger means adapted to project into said trough, said finger means being moved in a direction to move hay along the trough toward the center of said area.

23. The machine of claim 22 wherein: said finger means includes first fingers and second fingers, and means movably mounting said first and second fingers whereby said first and second fingers sequentially engage and move said hay in said trough toward the center of said area.

24. The machine of claim 20 wherein: said first movable means comprises finger means adapted to engage hay in said area and move hay toward the center of said area.

25. The machine of claim 24 wherein: said finger means includes first fingers and second fingers, and means movably mounting said first and second fingers whereby said first and second fingers sequentially engage and move said hay toward the center of said area.

26. The machine of claim 20 including: common drive means for the first and second means whereby the first and second means are concurrently operated.

27. The machine of claim 20 wherein: the second movable means includes helical means for elevating hay into the center area of the stack, and means to rotate the helical means.

28. The machine of claim 27 wherein: said means to rotate the helical means is drivably connected to the first movable means whereby the first movable means and helical means are concurrently operated.

29. The machine of claim 27 wherein: the means for moving hay around said area includes cage means and drive means for rotating the cage means around said area in the direction of rotation of the helical means.

30. The machine of claim 20 wherein: the means for moving hay around said area includes cage means and drive means for rotating the cage means around the area.

31. The machine of claim 30 wherein: the means for moving hay around said area includes compression means movably mounted on the cage means for engaging portions of the hay in said area and yieldably maintaining pressure on said portions of the hay.

32. A method of making a stack of hay and like materials with a machine having a platform with an upper surface and a space extended from the outer edge to the center area of the platform, said space extended in a longitudinal direction and being of a size to accommodate hay comprising: moving hay into said space from the outer edge toward the center area of the platform whereby the hay moves in the longitudinal direction of the space, elevating hay moved into the center area of the platform to build up the center area of the stack, moving the hay from the space onto the upper surface of the platform, moving the hay on the upper surface of the platform in a generally circular path to build a stack of hay from the bottom up, applying pressure in a downward direction on top portions of the hay on the platform during movement of the hay in said circular path, and removing the completed stack of hay from the platform.

33. The method of claim 32 wherein: the hay is moved into a trough having an elongated space located below the upper surface of the platform.

34. The method of claim 33 wherein: the hay is moved in a generally circular direction from said elongated space to said upper surface of the platform.

35. The method of claim 32 wherein: the hay is moved in a generally circular direction from said space to said upper surface of the platform.

36. A method of making a stack of hay and like materials with a machine having a platform with an upper surface for receiving a supply of hay and supporting a stack of hay comprising: moving hay to the upper surface of the platform and toward the center of the platform, elevating hay moved into the center of the platform to build up the center area of the stack, moving the hay on said upper surface of the platform in a generally circular path to form a stack of hay from the bottom up, applying pressure in a downward direction on portions of the hay on the platform during movement of the hay in said circular path on said platform, and removing the completed stack of hay from the platform.

37. The method of claim 36 wherein: the hay is moved into a trough having an elongated space located below the upper surface of the platform.

38. The method of claim 37 wherein: the hay is moved in a generally circular direction from said elongated space to said upper surface of the platform.

39. The method of claim 36 wherein: the hay is moved in a generally circular direction from said space to said upper surface of the platform.

40. A machine for making a stack of hay and like material comprising: a platform having a top surface for accommodating a stack of hay, said platform having wall means located below said top surface extended toward the center of the platform and in a circumferential direction defining a trough below the plane of said top surface for receiving and accommodating hay from a supply of hay, a feeding mechanism comprising a movable teeth means engagable with hay in said trough for moving the hay along the length of the trough toward the center of said platform, means for moving said teeth means, elevator means located in the center portion of said platform for receiving hay from said teeth means and moving said hay in an upward direction to form the center of the stack of hay on said platform, said elevator means including rotatable helical means positioned below the plane of said top surface of said platform adjacent the inner end of said trough, means to rotate said helical means, cage means movably mounted on said platform for moving hay from said trough means onto said top surface of the platform to form a stack of hay from the bottom thereof, means for rotating said cage means relative to said platform, and compression means movably mounted on said cage means for engaging portions of the hay on said platform and yieldably maintaining pressure on said portions of hay during the rotation of the cage means.

41. The machine of claim 40 including: the common drive means drivably connecting the means for moving said teeth means and said means for rotating said helical means whereby said teeth means and helical means are concurrently operated.

42. The machine of claim 40 wherein: said teeth means include first teeth and second teeth, and means movably mounting said first and second teeth whereby on operation of the means for moving said teeth means said first and second teeth sequentially engage and move said hay in the trough toward the center of the platform.

43. The machine of claim 40 wherein: said wall means includes an upright side wall extended from the outer periphery of the platform to the center area of the platform below said top surface thereof, said said walls having an elongated slots, said teeth means being located adjacent the side wall and movable through said slots to move said hay along the length of the trough toward the center area of the platform.

* * * * *